March 19, 1935. J. B. McGREGOR 1,994,917
THERMOSTATICALLY CONTROLLED DENTAL EQUIPMENT
Filed March 20, 1933 4 Sheets-Sheet 2
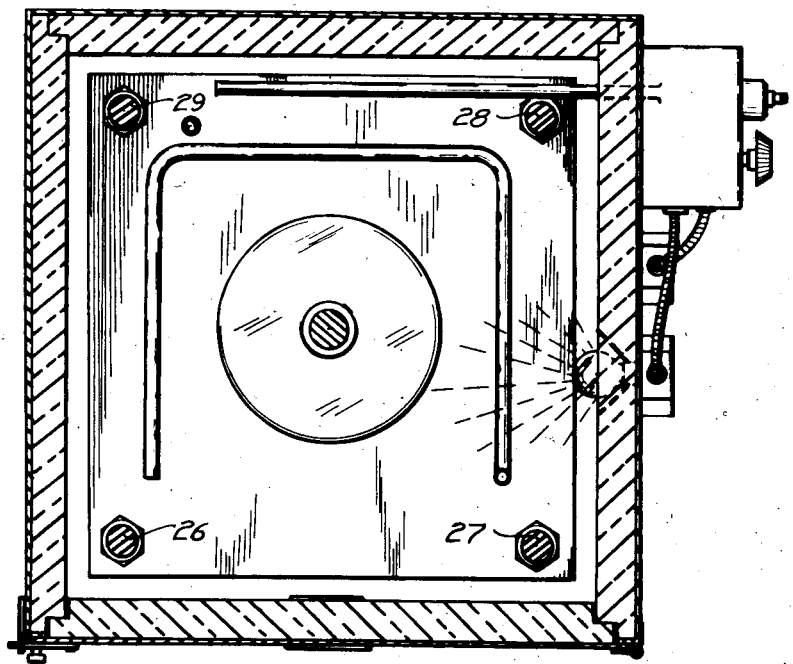
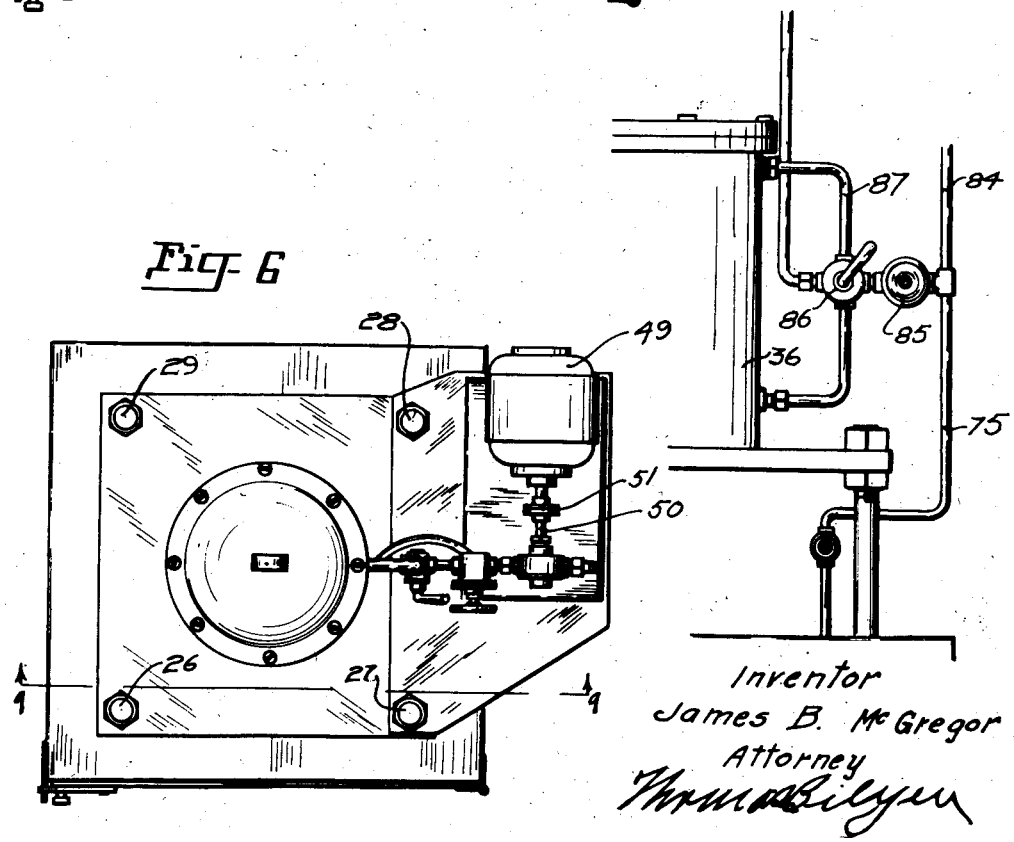
Inventor
James B. McGregor
Attorney

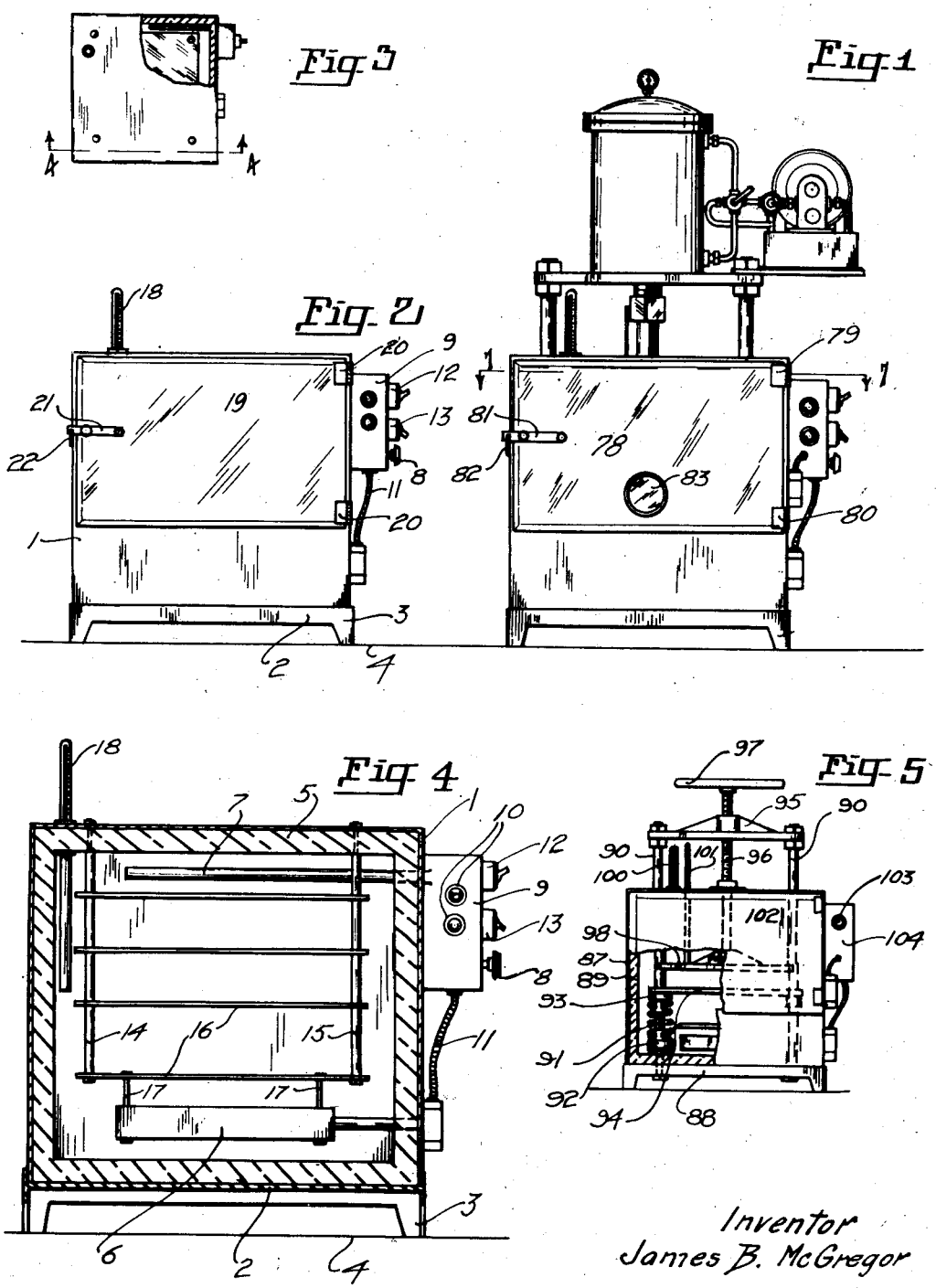

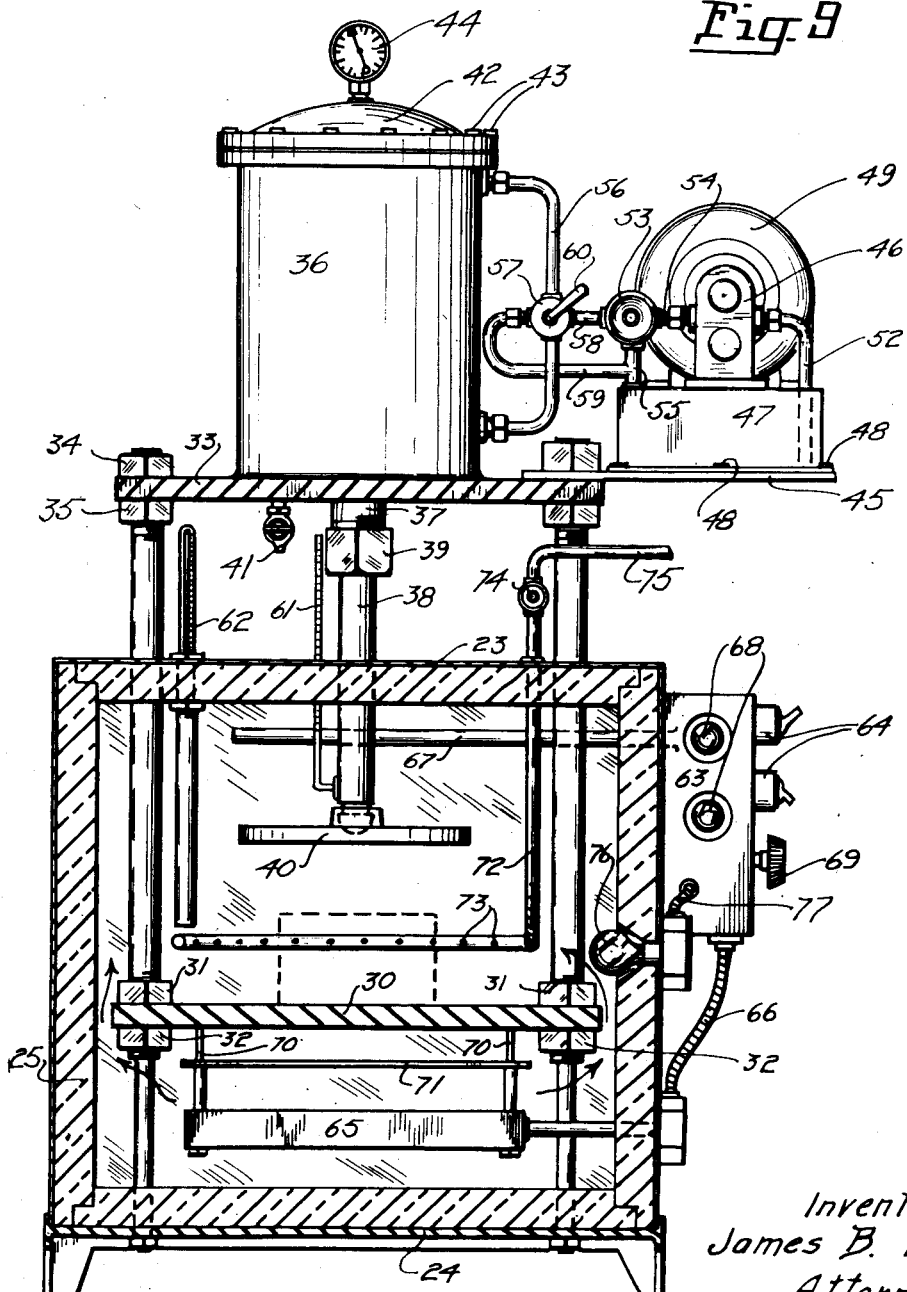

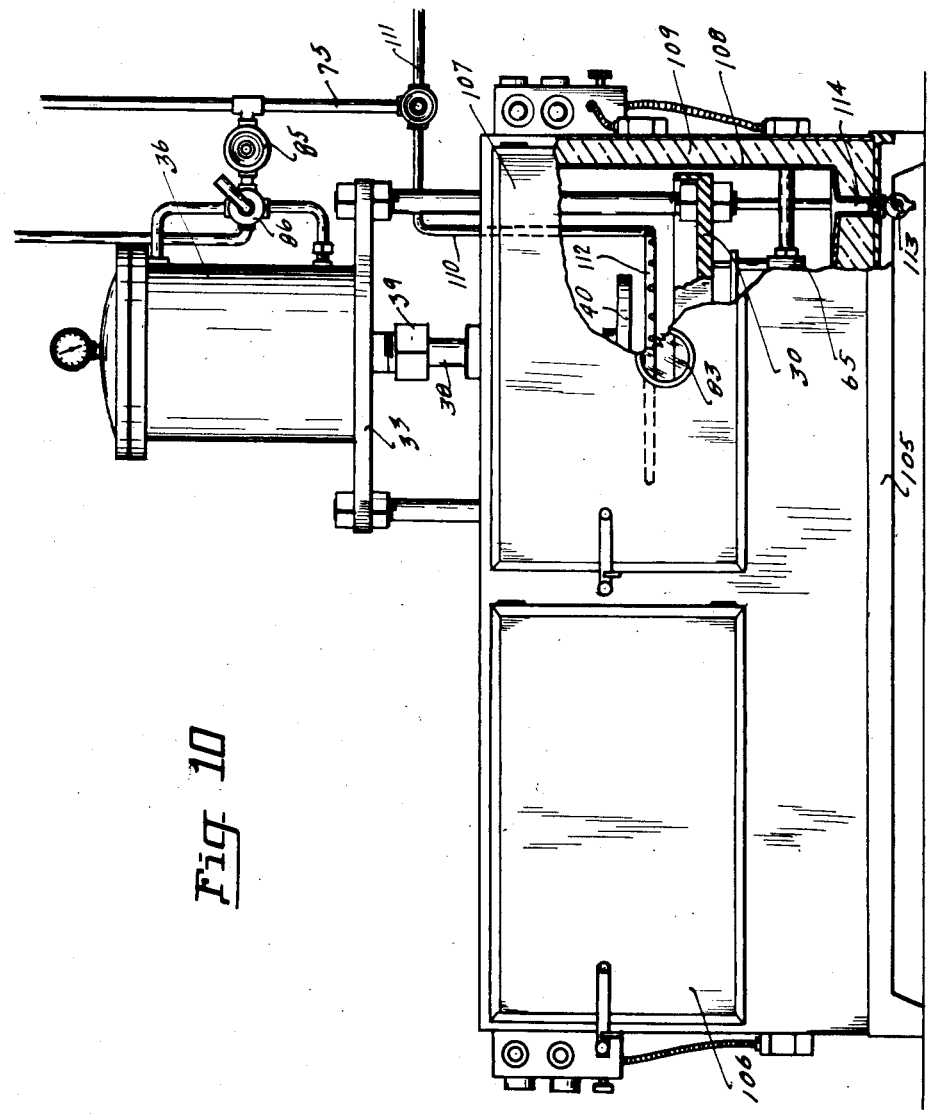

Patented Mar. 19, 1935

1,994,917

UNITED STATES PATENT OFFICE 1,994,917

THERMOSTATICALLY CONTROLLED DENTAL EQUIPMENT

James B. McGregor, Portland, Oreg.

Application March 20, 1933, Serial No. 661,780

5 Claims. (Cl. 219—35)

My invention relates to devices that are to be used for the preparation of artificial dentures and may be used in dental laboratories, in dental offices and in any and all places where artificial dentures are prepared.

My invention is particularly well adapted for use in processes as those where the work is to be done within closely controlled temperature ranges.

After the artificial denture contained within a suitable dental flask has been heat treated to the desired degree of temperature and of dehydration, it is placed in a thermostatically controlled electrically heated denture press through which suitable pressure is developed mechanically or hydraulically, the temperature being maintained and controlled by means similar to those utilized in the dehydrating unit. Means for provided for aerating the interior of the press for quickly reducing the temperature thereof and of the dental flask and enclosed artificial denture.

The primary object of my invention is to provide simply constructed devices adapted for a relatively large production of artificial dentures and in which the temperature range may be automatically controlled within close limits and in which the pressure may also be closely controlled and automatically regulated.

A still further object of my invention consisting so constructing my devices that they will be of minimum cost at the point of origin, that they may be easily operated by unskilled workers and that they will have a maximum rate of production.

A still further object of my invention consists in so constructing and regulating the devices that they will facilitate the production of artificial dentures of a high quality and at a minimum of cost.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of the assembled thermostatically controlled oven and hydraulically operated press.

Fig. 2 is a front view of the thermostatically controlled dehydrating preheater that may be made as an independent unit as shown, or made in combination with the device illustrated in Fig. 1 as a single unit.

Fig. 3 is a top plan view partially in section of the dehydrator illustrated in Fig. 2.

Fig. 4 is a sectional side view of the dehydrator illustrated in Figs. 2 and 3. This view is taken on line 4—4 of Fig. 3, looking in the direction indicated.

Fig. 5 is a front view, partially in section, of a thermostatically controlled hand operated press.

Fig. 6 is a top plan view of the thermostatically controlled oven and hydraulically operated press illustrated in Fig. 1.

Fig. 7 is a sectional plan view of the device illustrated in Fig. 1. This view is taken on line 7—7 of Fig. 1, looking in the direction indicated.

Fig. 8 is a fragmentary side view of the press associated with the oven, together with the related piping. This piping is particularly adapted for the use of compressible fluid as the operating medium for the press.

Fig. 9 is a vertical sectional front view of the assembled device. This view is taken on line 9—9 of Fig. 6, looking in the direction indicated.

Fig. 10 is a front view partially in section of the assembled device illustrating a manner in which the dehydrating preheater might be associated with the invention to form a unit device. In this view also is shown the press as having a metal inner lining to prevent steam or vapor immediately contacting the insulating material when the process is carried on in the press of high humidity.

Like reference characters refer to like parts throughout the several views.

After the contents of the dental flasks have been sufficiently dehydrated and heated they are transferred from the dehydrator to the thermostatically controlled press oven. The press associated with the oven may be hand operated or it may be hydraulically or pneumatically operated. The press may be made integral with or detachable from the oven.

A metal frame 23 is provided as illustrated in Fig. 9. The frame is superposed on a leg supported base 24 and is insulated upon its interior as illustrated at 25. Four supporting rods 26, 27, 28 and 29 are provided and near the lower ends thereof are shouldered and extend through the base and are secured thereto by suitable fastening means as threaded nuts placed upon the lower ends thereof.

A base plate 30 is adjustably secured to the supporting rods. Satisfactory results may be obtained by threading the lower end of greater diameter of the supporting rods and securing the base plate 30 thereto between clamping nuts 31 and 32. The supporting rods extend through the top of the press oven and have adjustably secured thereto the base plate 33 of the press, as by being placed between threaded nuts 34 and 35 disposed upon the upper ends of the supporting rods. Pressure cylinder 36 may be formed integral with the top pressure plate 33 or it may be formed independent thereof and removably affixed thereto.

A packing gland 37 is provided to form a stuffing box around the piston rod 38. The stuffing material is maintained in a proper compressed condition through the use of gland nut 39. The piston rod 38 extends through the top of the press oven and a head 40 is pivotally secured to the lower end of the piston rod within the oven. The head 40 is pivotally secured to the lower end of the piston rod to compensate for any slight surface variations of the flask to be compressed between the press head 40 and the base plate 30. A bleed valve 41 is provided at the base of the cylinder 36 to facilitate draining the cylinder when desired.

A cylinder head 42 is removably secured to the top of the cylinder, through the use of suitable means as of cap screws 43. A pressure indicator 44 is secured to the cylinder head. A piston is operably disposed within the cylinder and secured to the upper end of the piston rod 38. A supporting bracket 45 outwardly extends from and is secured to the base plate 33. A fluid pump 46 is disposed upon a pump base 47. A sump is disposed within the base of the pump frame and the pump frame is secured to the bracket by bolts 48. The pump may be driven by any suitable prime mover as an electric motor 49. The armature shaft of the motor is connected to the pump shaft 50 by a flexible driving connection 51. A pipe 52 leads from the sump to the inlet port of the pump. A manually adjustable by-pass valve 53 is disposed within discharge pipe 54 leading from the pump and such pumped liquid as does not pass into the cylinder is by-passed back into the pump through pipe 55. A manifold 56 is connected to the oppositely disposed ends of the cylinder 36 and a multiple ported valve 57 is so disposed within the manifold as to communicate, via pipe 58 with the valve 53, via pipe 59 with the by-pass pipe connection 55, and by way of the manifold with the ends of the cylinder 36. The valve 57 is adapted for manual manipulation through a hand lever 60.

I secure a graduated indicator stem 61 to the lower end of the piston rod and extend the same upwardly through the press oven. The object of the graduated indicator is to indicate the extent of the movement of the piston rod 38.

I place a thermometer 62 through the top of the press oven and extend the same into the interior of the oven in order that a precise temperature indication of the interior of the press may be made available.

I place a switch box 63 upon the exterior of the frame 23 with electric switches 64 disposed thereupon to control the flow of electricity therethrough. A heating element 65 is disposed within the press oven and a plurality of heating units are disposed therein in order that a suitable regulation of the thermal emission be obtained. Electric current is passed through the heating element 65 via electric conductor 66. A thermostat 67 is suitably disposed within the press oven and controls the flow of electricity to the heating element. Electric lamps 68 are so disposed within the electric circuit as to indicate whether the current is on or off. The temperature to be maintained within the press oven is determined by a hand manipulative control 69, that operates in conjunction with and controls the thermostat 67.

The heating element is suspended from the base plate 30 by suspension rods 70. A baffle or heat diffusing plate 71 is disposed between the heat element 65 and the base plate 30. This diffusing plate is to prevent the concentration of the heat immediately below the base plate 30. In order that the interior of the press may be quickly cooled I place an air pipe 72 within the interior of the press oven and provide a plurality of openings therein, placing the interior of the air pipe in open communication with the interior of the press oven.

In order to regulate the flow of air I place a valve 74 within the pipe. The pipe 75 leads to a source of compressed air supply not here shown. An electric lamp 76 is disposed within the press oven and is energized by current passing through conductor 77. A door 78 is hingedly secured to the case by supporting hinges 79 and 80. A fastening hasp 81 is hingedly secured to the door and adapted to engage locking latch 82 for maintaining the door in closed position. A peep hole 83 is disposed within the door and facilitates inspection of the flasks disposed within the press oven. The door is insulated to minimize thermal radiation therefrom.

Instead of being hydraulically operated as a self contained unit the press cylinder may be operated from an independent source of power as compressed air. When so operated the piping connections may be made substantially as illustrated in Fig. 8 and when so arranged air is admitted into the interior of the press oven through a pipe 84 leading from a source of supply not here shown.

A reducing valve 85 is disposed between the supply pipe 84 and hand manipulated multiple ported valve 86 which is disposed within manifold 87 communicating with the oppositely disposed ends of the cylinder 36.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of an insulated oven including an electric heating element within the oven, means for conducting electricity to the heat element, means associated with the interior of the oven and with the electricity conducting means for automatically controlling the temperature within the oven, a press plate horizontally and adjustably supported between the base and the top of the oven, means for adjustably supporting the press plate, means for aerating the oven; and a hydraulic press including means for securing the press to the oven, a piston rod extending from the piston through the top of the oven, a packing gland placed around the piston rod adjacent the press cylinder, a press head swively secured to the end of the piston rod within the oven, and means for determining the distance traveled by the piston head, and means for automatically controlling the amount of pressure to be applied to the piston.

2. In a device of the class described, the combination of an insulated oven including a press plate horizontally and adjustably supported between the base and the top of the oven by a plurality of shouldered supporting members secured to the base at their end of lesser diameter and extending upwardly through the press plate and through the top of the oven, means associated with the lower end of greater diameter of the shouldered bolt members for adjustably supporting the press plate, a heating element secured to and below the press plate, means for conducting electricity to the heating element, means associated with the interior of the oven and with the electricity conducting means for automatically controlling the temperature within the oven, a heat deflecting plate secured between the heating element and the press plate, means for aerating the interior of the oven; and a hydraulic press having its base plate secured to the upper end of the shouldered bolt members, and including a piston rod extending from the piston downwardly through a packing gland on the cylinder and on through the top of the oven, a press head swivelly secured to the end of the piston rod within the oven, a graduated gauge secured to the piston rod and extending upwardly through the top of the oven, and means for automatically controlling the amount of pressure applied to the piston.

3. In a device of the class described, as characterized in claim 2, including a fluid pump operated by a prime mover, a fluid conductor communicating between the reservoir and the intake of the pump, a by-pass valve communicating with the pump and the reservoir, means for operating said valve, a multiple ported valve communicating with the by-pass valve, the reservoir, and the top and bottom of the hydraulic cylinder and means for controlling the direction and rate of fluid flow through said valve.

4. In a combination insulated oven having a heating element and means associated therewith for automatically controlling the temperature of the oven, and a hydraulic press, having associated therewith means for automatically controlling the pressure applied to the piston of the press; the combination with the oven and the press of means for supporting a press plate horizontally and adjustably within the oven, means for securing the heat element below the press plate, a heat deflecting plate supported between the heat element and the press plate, means for aerating the oven, means for supporting the hydraulic press upon the press plate supporting means so the piston rod extends downwardly through the top of the oven, a press head swivelly secured to the end of the piston rod within the oven, and a graduated movement determining means secured to the piston rods and extending upwardly through the top of the oven.

5. In a combination insulated oven having a heating element and means associated therewith for automatically controlling the temperature of the oven, and a hydraulic press, having associated therewith means for automatically controlling the pressure applied to the piston of the press; the combination with the oven and the press of a press plate supported horizontally and adjustably within the oven by a plurality of shouldered supporting members secured to the base of the oven at their lesser diameter and extending upwardly through the press plate and the top of the oven, means associated with the lower end of greater diameter of the shouldered supporting members for adjustably supporting the press plate, the heating element secured below the press plate, a heat deflecting plate secured between the heating element and the press plate, means for aerating the oven, means for securing the hydraulic press to the upper end of the shouldered supporting members, the piston rod extending downwardly from the piston through the top of the oven, a press head swivelly secured to the end of the piston rod within the oven, and a graduated movement determining means secured to the piston rod and extending upwardly through the top of the oven.

JAMES B. McGREGOR.